United States Patent
Lee et al.

(10) Patent No.: US 8,442,017 B2
(45) Date of Patent: May 14, 2013

(54) METHOD FOR TRANSMITTING RANDOM ACCESS CHANNEL MESSAGE AND RESPONSE MESSAGE, AND MOBILE COMMUNICATION TERMINAL

(75) Inventors: Young Dae Lee, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 12/447,698

(22) PCT Filed: Oct. 30, 2007

(86) PCT No.: PCT/KR2007/005397
§ 371 (c)(1),
(2), (4) Date: Apr. 29, 2009

(87) PCT Pub. No.: WO2008/054119
PCT Pub. Date: May 8, 2008

(65) Prior Publication Data
US 2010/0046384 A1    Feb. 25, 2010

Related U.S. Application Data

(60) Provisional application No. 60/863,545, filed on Oct. 30, 2006, provisional application No. 60/884,198, filed on Jan. 9, 2007.

(30) Foreign Application Priority Data

Oct. 30, 2007    (KR) .................. 10-2007-0109486

(51) Int. Cl.
*H04W 4/00*    (2009.01)

(52) U.S. Cl.
USPC ........................................................ 370/338

(58) Field of Classification Search .................. None
See application file for complete search history.

(56) References Cited

U.S. PATENT DOCUMENTS

| 4,205,200 A | 5/1980 | Parikh et al. |
| 5,588,009 A | 12/1996 | Will |

(Continued)

FOREIGN PATENT DOCUMENTS

| CN | 1719932 A | 1/2006 |
| CN | 1731887 A | 2/2006 |

(Continued)

OTHER PUBLICATIONS

3GPP TSG-RAN WG2 Meeting #56-bis, R2-070107, "Requirements for redirection in E-UTRAN (Nokia, Jan. 2007)", Jan. 15-19, 2007, Sorrento, Italy.

(Continued)

*Primary Examiner* — Andrew Lai
*Assistant Examiner* — Leon Andrews
(74) *Attorney, Agent, or Firm* — Birch, Stewart, Kolasch & Birch, LLP

(57) ABSTRACT

A method for responding to a random access channel message is disclosed, the method includes reading quality measurement information of a downlink channel from a second layer header of a random access channel (RACH) message which is transmitted from a user equipment to an uplink, controlling transmission power of a response message for the RACH message according to the quality measurement information, and transmitting the response message to the user equipment.

20 Claims, 6 Drawing Sheets

U.S. PATENT DOCUMENTS

| | | |
|---|---|---|
| 6,157,833 A | 12/2000 | Lawson-Jenkins et al. |
| 6,233,430 B1 | 5/2001 | Helferich |
| 6,324,171 B1 | 11/2001 | Lee et al. |
| 6,353,628 B1 | 3/2002 | Wallace et al. |
| 6,526,027 B1 | 2/2003 | Yeom |
| 6,567,409 B1 | 5/2003 | Tozaki et al. |
| 6,725,267 B1 | 4/2004 | Hoang |
| 6,785,250 B2 | 8/2004 | Vayanos et al. |
| 6,795,419 B2 | 9/2004 | Parantainen et al. |
| 6,859,445 B1 | 2/2005 | Moon et al. |
| 7,039,425 B1 | 5/2006 | Mazawa et al. |
| 7,197,317 B2 | 3/2007 | Parkvall et al. |
| 7,245,707 B1 | 7/2007 | Chan |
| 7,373,148 B2 | 5/2008 | Kim et al. |
| 7,443,813 B2 | 10/2008 | Hwang et al. |
| 7,525,908 B2 | 4/2009 | Olsson et al. |
| 7,551,643 B2 | 6/2009 | Yeo et al. |
| 7,606,370 B2 | 10/2009 | Lillie et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,719 B2 | 1/2011 | Chun et al. |
| 7,864,731 B2 | 1/2011 | Forsberg |
| 7,899,451 B2 | 3/2011 | Hu et al. |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 2001/0017850 A1 | 8/2001 | Kalliokulju et al. |
| 2001/0034791 A1 | 10/2001 | Clubb et al. |
| 2001/0044322 A1 | 11/2001 | Raaf |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2002/0114294 A1 | 8/2002 | Toskala et al. |
| 2003/0007490 A1 | 1/2003 | Yi et al. |
| 2003/0007512 A1 | 1/2003 | Tourunen et al. |
| 2003/0050078 A1 | 3/2003 | Motegi et al. |
| 2003/0119488 A1 | 6/2003 | Hans et al. |
| 2003/0123485 A1 | 7/2003 | Yi et al. |
| 2003/0139170 A1 | 7/2003 | Heo |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willeneger et al. |
| 2003/0223452 A1 | 12/2003 | Toskala et al. |
| 2004/0014452 A1 | 1/2004 | Lim et al. |
| 2004/0028078 A1 | 2/2004 | Beckmann et al. |
| 2004/0039830 A1 | 2/2004 | Zhang et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0121771 A1 | 6/2004 | Song et al. |
| 2004/0146019 A1 | 7/2004 | Kim et al. |
| 2004/0146067 A1 | 7/2004 | Yi et al. |
| 2004/0147269 A1 | 7/2004 | Kim |
| 2004/0148427 A1 | 7/2004 | Nakhjiri et al. |
| 2004/0180675 A1 | 9/2004 | Choi et al. |
| 2004/0188837 A1 | 9/2004 | Kim et al. |
| 2004/0202107 A1 | 10/2004 | Bensimon et al. |
| 2004/0229605 A1 | 11/2004 | Hwang et al. |
| 2004/0233870 A1 | 11/2004 | Willenegger et al. |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0032555 A1 | 2/2005 | Jami et al. |
| 2005/0037767 A1 | 2/2005 | Kim et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0058078 A1 | 3/2005 | Jung et al. |
| 2005/0063347 A1 | 3/2005 | Sarkkinen et al. |
| 2005/0070253 A1 | 3/2005 | Farnsworth et al. |
| 2005/0085254 A1 | 4/2005 | Chuah et al. |
| 2005/0094670 A1 | 5/2005 | Kim |
| 2005/0094690 A1 | 5/2005 | Kubota |
| 2005/0096017 A1 | 5/2005 | Kim |
| 2005/0100048 A1 | 5/2005 | Chun et al. |
| 2005/0141462 A1 | 6/2005 | Aerrabotu |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0034335 A1 | 2/2006 | Karaoguz et al. |
| 2006/0067324 A1 | 3/2006 | Kim et al. |
| 2006/0067364 A1* | 3/2006 | Jung et al. ............ 370/469 |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0126570 A1 | 6/2006 | Kim et al. |
| 2006/0165045 A1 | 7/2006 | Kim et al. |
| 2006/0187846 A1 | 8/2006 | Pelleyier et al. |
| 2006/0195540 A1 | 8/2006 | Hamilton et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0024972 A1 | 2/2007 | Kuerz et al. |
| 2007/0041349 A1 | 2/2007 | Kim et al. |
| 2007/0041382 A1 | 2/2007 | Vayanos et al. |
| 2007/0047452 A1 | 3/2007 | Lohr et al. |
| 2007/0047582 A1 | 3/2007 | Malkamaki |
| 2007/0060139 A1 | 3/2007 | Kim et al. |
| 2007/0064631 A1 | 3/2007 | Tseng et al. |
| 2007/0064665 A1 | 3/2007 | Zhang et al. |
| 2007/0155389 A1 | 7/2007 | Zhang |
| 2007/0155390 A1 | 7/2007 | Kodikara Patabandi et al. |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0206531 A1 | 9/2007 | Pajukoski et al. |
| 2007/0224993 A1 | 9/2007 | Forsberg |
| 2007/0248075 A1 | 10/2007 | Liu et al. |
| 2007/0254679 A1 | 11/2007 | Montojo et al. |
| 2007/0258591 A1 | 11/2007 | Terry et al. |
| 2007/0291634 A1 | 12/2007 | Kwon et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0004058 A1 | 1/2008 | Jeong et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167054 A1 | 7/2008 | Shaheen |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |

| | | | |
|---|---|---|---|
| 2008/0225765 A1 | 9/2008 | Marinier et al. | |
| 2008/0240439 A1 | 10/2008 | Mukherjee et al. | |
| 2008/0259912 A1 | 10/2008 | Wang et al. | |
| 2008/0267126 A1 | 10/2008 | Vujcic et al. | |
| 2008/0267405 A1 | 10/2008 | Vialen et al. | |
| 2008/0268850 A1 | 10/2008 | Narasimha et al. | |
| 2008/0273610 A1 | 11/2008 | Malladi et al. | |
| 2008/0280567 A1 | 11/2008 | Sharma | |
| 2008/0285691 A1 | 11/2008 | Onggosanusi et al. | |
| 2008/0287091 A1 | 11/2008 | Suzuki et al. | |
| 2008/0310452 A1 | 12/2008 | Vedantham et al. | |
| 2008/0316959 A1 | 12/2008 | Bachl et al. | |
| 2009/0005051 A1 | 1/2009 | Voyer et al. | |
| 2009/0022107 A1 | 1/2009 | Kapoor et al. | |
| 2009/0034466 A1 | 2/2009 | Lindskog et al. | |
| 2009/0040982 A1 | 2/2009 | Ho et al. | |
| 2009/0086659 A1 | 4/2009 | Pani et al. | |
| 2009/0086710 A1 | 4/2009 | Ho | |
| 2009/0092076 A1 | 4/2009 | Zheng et al. | |
| 2009/0109912 A1 | 4/2009 | DiGirolamo et al. | |
| 2009/0124259 A1 | 5/2009 | Attar et al. | |
| 2009/0143074 A1 | 6/2009 | Pelletier et al. | |
| 2009/0163199 A1 | 6/2009 | Kazmi et al. | |
| 2009/0181710 A1 | 7/2009 | Pani et al. | |
| 2009/0207771 A1 | 8/2009 | Lindskog et al. | |
| 2009/0239538 A1 | 9/2009 | Motegi et al. | |
| 2009/0264164 A1 | 10/2009 | Chun et al. | |
| 2009/0318170 A1 | 12/2009 | Lee et al. | |
| 2010/0027413 A1 | 2/2010 | Park et al. | |
| 2010/0046384 A1* | 2/2010 | Lee et al. | 370/252 |
| 2010/0061330 A1 | 3/2010 | Hanov | |
| 2010/0067495 A1 | 3/2010 | Lee et al. | |
| 2010/0075635 A1 | 3/2010 | Lim et al. | |
| 2010/0128669 A1 | 5/2010 | Chun et al. | |
| 2010/0137016 A1 | 6/2010 | Voyer | |
| 2010/0165901 A1 | 7/2010 | Kim | |
| 2010/0195568 A1 | 8/2010 | Iimori | |
| 2010/0227614 A1 | 9/2010 | Chun et al. | |
| 2010/0238799 A1 | 9/2010 | Sebire | |
| 2010/0238903 A1 | 9/2010 | Kitazoe | |
| 2010/0254340 A1 | 10/2010 | Park et al. | |
| 2010/0265896 A1 | 10/2010 | Park et al. | |
| 2010/0272004 A1 | 10/2010 | Maeda et al. | |
| 2010/0309877 A1* | 12/2010 | Damnjanovic et al. | 370/331 |
| 2011/0039536 A1 | 2/2011 | Lee et al. | |
| 2011/0090836 A1 | 4/2011 | Mochizuki et al. | |
| 2011/0116436 A1 | 5/2011 | Bachu et al. | |
| 2011/0182243 A1 | 7/2011 | Gallagher et al. | |
| 2011/0207427 A1 | 8/2011 | Kitani et al. | |
| 2011/0261743 A1 | 10/2011 | Futaki et al. | |
| 2012/0002589 A1 | 1/2012 | Saifullah et al. | |

FOREIGN PATENT DOCUMENTS

| | | |
|---|---|---|
| CN | 1835627 A | 9/2006 |
| EP | 0 889 664 A2 | 1/1999 |
| EP | 1 148 753 A2 | 10/2001 |
| EP | 1168877 A1 | 1/2002 |
| EP | 1209938 A1 | 5/2002 |
| EP | 1 304 898 A1 | 4/2003 |
| EP | 1 315 356 A2 | 5/2003 |
| EP | 1 318 632 A2 | 6/2003 |
| EP | 1337124 A2 | 8/2003 |
| EP | 1 372 310 A1 | 12/2003 |
| EP | 1 420 551 A2 | 5/2004 |
| EP | 1 501 328 A2 | 1/2005 |
| EP | 1511245 A2 | 3/2005 |
| EP | 1720322 A1 | 11/2006 |
| EP | 1720373 A1 | 11/2006 |
| EP | 1 932 380 A2 | 6/2008 |
| EP | 2087653 A1 | 8/2009 |
| JP | 6-006294 A | 1/1994 |
| JP | 2002-539686 A | 11/2002 |
| JP | 2003-504935 A | 2/2003 |
| JP | 2003-87180 A | 3/2003 |
| JP | 2003-196775 A | 7/2003 |
| JP | 2003-235064 A | 8/2003 |
| JP | 2004-134904 A | 4/2004 |
| JP | 2005-39726 A | 2/2005 |
| JP | 2005-57787 A | 3/2005 |
| JP | 2005-354488 A | 12/2005 |
| JP | 2006-505979 A | 2/2006 |
| JP | 2006-67115 A | 3/2006 |
| JP | 2006-515737 A | 6/2006 |
| JP | 2006-528456 A | 12/2006 |
| JP | 2007-165635 A | 6/2007 |
| JP | 2008-535370 A | 6/2008 |
| JP | 2008-539678 A | 11/2008 |
| JP | 2009-540721 A | 11/2009 |
| JP | 2009-542100 A | 11/2009 |
| KR | 2001-0105240 A | 11/2001 |
| KR | 10-2003-0026924 A | 4/2003 |
| KR | 10-0585603 | 5/2003 |
| KR | 10-2004-0039944 A | 5/2004 |
| KR | 10-2004-0048675 A | 6/2004 |
| KR | 10-2005-0008440 A | 1/2005 |
| KR | 10-2005-0027972 A | 3/2005 |
| KR | 10-2005-0096763 A | 10/2005 |
| RU | 2249917 C2 | 4/2005 |
| WO | WO 00/11878 A2 | 3/2000 |
| WO | WO-00/74416 A1 | 12/2000 |
| WO | WO 02/39622 A1 | 5/2002 |
| WO | WO-2004/043094 A2 | 5/2004 |
| WO | WO-2004/064272 A1 | 7/2004 |
| WO | WO-2005/048613 A1 | 5/2005 |
| WO | WO 2006/000876 A1 | 1/2006 |
| WO | WO 2006/011763 A2 | 2/2006 |
| WO | WO 2006/018670 A1 | 2/2006 |
| WO | WO 2006/049441 A1 | 5/2006 |
| WO | WO 2006/075820 A1 | 7/2006 |
| WO | WO-2006/104344 A2 | 10/2006 |
| WO | WO-2006/109851 A1 | 10/2006 |
| WO | WO 2006/116620 A2 | 11/2006 |
| WO | WO 2007/025138 A2 | 3/2007 |
| WO | WO-2007/052888 A2 | 5/2007 |
| WO | WO-2007/078155 A2 | 7/2007 |
| WO | WO-2007/078172 A2 | 7/2007 |
| WO | WO 2007/078929 A2 | 7/2007 |
| WO | WO-2007/133034 A2 | 11/2007 |
| WO | WO 2008-042889 A1 | 4/2008 |
| WO | WO 2008/111684 A1 | 9/2008 |
| WO | WO 2009/084998 A1 | 7/2009 |

OTHER PUBLICATIONS

Catt et al., "Enhancement to Buffer Status Reporting," 3GPP Draft; R2-071345, 3rd Generation Partnership Project (3GPP), Mobile Competence Centre, RAN WG2, Sorrento, Italy, Jan. 12, 2007, XP05134291.

NTT DoCoMo, Inc. et al., "MAC PDU structure for LTE," 3GPP draft, R2-070280, 3rd Generation Partnership Project (3GPP), Mobile Competence Centre; RAN WG2, Sorrento, Italy, Jan. 15-19, 2007, XP050133369.

IPWIRELESS: "Layer 2 functions for LTE," Discussion and Decision, 3GPP TSG RAN WG2 #48bis, Cannes, France, Oct. 10-14, 2005, Tdoc R2-052377.

Samsung Electronics Co., LTD.: "Selective forwarding/retransmission during HO," Discussion and Decision, 3GPP TSG-RAN2 Meeting #56bis, Sorrento, Italy, Jan. 15-19, 2007, 5 pages, Tdoc R2-070130.

Samsung Electronics Co., LTD.: "Re-use of PDCP SN at ARQ Level?," 9.4, Discussion and Decision, 3GPP TSG-RAN2 Meeting #53bis, Cannes, France, Jun. 27-30, 2006, Tdoc R2-061829.

"Contents of PDCP Status Report", LG Electronics Inc., Oct. 8-12, 2007, pp. 1-3, Shanghai, China, XP-002580785.

"PDCP Retransmissions", LG Electronics Inc., Aug. 19-24, 2007, pp. 1-3, Athens, Greece, XP050135778.

"PDCP Structure and Traffic Path ", LG Electronics Inc., Aug. 20-24, 2007, pp. 1-3, Athens, Greece, XP-050135985.

R2-070096 "MAC PDU Format for LTE", 3GPP TSG RAN WG2 #56bis Jan. 15-19, 2007, Sorrento, Italy.

R2-050852, "Relative Buffer Status Reporting", 3GPP TSG RAN WG2 meeeting#46bis, Apr. 4-6, 2005. Beijing, China.

Gao et al., "Research on the Access Network and MAC Technique for Beyond 3G Systems", IEEE Wireless Communications, IEEE Service Center, vol. 14, No. 2, Apr. 1, 2007, pp. 57-61.

XP002460800; Alcatel-Lucent: "Downlink Control Signaling and Multiplexing for VOIP, R1-071721" Jun. 26, 2007, pp. 1-4.
XP002602993; Nokia Corporation, Nokia Siemens Networks: "MAC header format, R2-073891", 3GPP TSG_RAN WG2 meeting 59bis, Oct. 1, 2007.
XP050134474; LG Electronics Inc: "Support for VoIP over MAC-hsEHS" 3GPP DRAFT; R2-071542, Apr. 2, 2007.
3GPP Draft; R2-081607, "UL Timing Control related to Contention Resolution," 3GPP TSG-RAN WG2 #61bis, Shenzhen, China, Mar. 31-Apr. 4, 2008, XP050139334 (retrieved on Mar. 25, 2008).
3GPP: Technical Specification Group Radio Access Network; Evolved Universal Terrestrial Radio Access (E-UTRA) Medium Access Control (MAC) protocol specification (Release 8), 3GPP TS 36.321 V8.1.0, Mar. 2008, XP050377617.
U.S. Office Action dated Apr. 1, 2011 for U.S. Appl. No. 12/312,172.
3GPP TSG RAN WG2 #56, "Views on DRX/DTX control in LTE", R2-063397, 3rd Generation Partnership Project, vol. RAN WG2, No. Riga, Latvia, Nov. 2, 2006, XP050132870.
3GPP TSG-RAN WG2 Meeting #55, "Active Mode DRX", R2-062752, 3rd Generation Partnership Project, Oct. 13, 2006, XP002437990.
3GPP TSG-RAN WG2 Meeting #57, "DRX in E-UTRAN", R2-070463, 3rd Generation Partnership Project, vol. RAN WG2, Feb. 9, 2007, XP050133530.
LG Electronics, "Discussion on Message 4 in Random Access", 3GPP TSG-RAN WG2 #57, R2-070519, Feb. 15-19, 2007, 4 pages.
LG Electronics, "Discussion on Message 4 in Random Access", 3GPP TSG-RAN WG2 #57bis, R2-071456, Mar. 26-30, 2007, 4 pages.
LG Electronics, "Discussion on Message 4 in Random Access", 3GPP TSG-RAN WG2 #58, R2-071923, May 7-11, 2007, 4 pages.
LG Electronics, 3GPP TSG RAN WG2#57bis, "U-plane ciphering at MAC/Physical Layer," St. Julian's, Malta, Mar. 26-30, 2007, R2-071550, pp. 1-3.
NTT DoCoMo, Inc, (E-mail rapporteur), 3GPP TSG RAN WG2 #57bis, "E-mail disussion on U-plane ciphering location for LTE,"St. Julian's, Malta, Mar. 26-30, 2007, Tdoc R2-071293, pp. 1-5.
Ericsson, "Initial Random Access Prodedure for E-UTRAN," 3GPP TSG-RAN WG2 #55, Tdoc R2-062853, Seoul, Korea, Oct. 9-13, 2006, 6 pages.
IPWIRELESS, "Contention Resolution in Non-Synchronous RACH Access,"RAN2#54, Tdoc R2-062269, Aug. 28-Sep. 1, 2006, 5 pages.
Samsung, "LTE Random Access Prodedure,"3GPP TSG RAN2#54, R2-062258, Tallinn, Estonia, Aug. 28-Sep. 2, 2006, 4 pages.
Siemens, "Initial Access Procedure," 3GPP TSG-RAN WG2 LTE AdHoc Meeting, R2-061831, Cannes, France, Jun. 27-30, 2006, 5 pages.
Ericsson, "MAC Header for Improved I.2 Support for High Data Rates," 3GPP TSG-RAN WG2#57, Tdoc R2-070810, St. Louis, USA, Feb. 12-16, 2007, 4 pages, XP0510133836.
CATT, "Non-synchronized access and C-RNTI allocation", 3GPP TSG-RAN WG2#55, R2-062933, Oct. 9-13, 2006, p. 1-7.
LG Electronics, "Multi-level DRX Operation in CELL_PCH", 3GPP TSG-RAN WG2 #58, R2-071930, May 7-11, 2007, 4 pages.
NEC, "Fast setup for PS services (CELL PCH & URA PCH)", 3GPP TSG-RAN WG2 #54, Tdoc R2-062328, Aug. 28-Sep. 1, 2006, 6 pages.
R2-062933—Non-synchronized access and C-RRNTI allocation, Oct. 9-13, 2006.
R2-070265—DRX Scheme, Jan. 15-19, 2007.
R2-071403—Discontinuous reception in CELL_PACH, Mar. 26-30, 2007.
Sammour, "Method and System for Enhancing Discontinuous Reception in Wireless Systems," U.S. Appl. No. 60/863,185 filed Oct. 27, 2006.
"3rd Generation Partnership Project; Technical Specification Group Radio Access Network; Medium . . . ," 3GPP TS 25.321, 3rd Generation Partnership Project (3GPP), Mobile Competence Centre; 650, Route Des Lucioles; F-06921 Sophia-Antipolis Cedex; France, Mar. 1, 2007, pp. 1-126, XP050367709.
"3rd Generation Partnership Project; Technical Specification Group Radio Access Network; Packet Data . . . ," 3GPP TS 25.323, Mobile Competence Centre; 650, Route Des Lucioles; F-06921 Sophia-Antipolis Cedex; France, Mar. 1, 2007, pp. 1-44, XP050367856.
Asustek: "Granularity consideration for variable RLC PDU sizes," 3GPP TSG-RAN WG2 Meeting #56bis, Sorrento, Italy, Jan. 15-19, 2007, R2-070336, pp. 1-3.
Bosch: "Header compression signaling," TSG-RAN Wroking Group 2 (Radio layer 2 and Radio layer 3), Sophia Antipolis, Nov. 29-Dec. 3, 1999, XP050114120, pp. 1-2.
Qualcomm Europe, "Open issues in random access procedure", Discussion, 3GPP TSG-RAN WG2 #55, Oct. 9-13, 2006, Seoul, Korea, pp. 1-3, R2-063034.
Samsung, "LTE Handover Procedures, Text Proposal", 3GPP TSG-RAN3 Meeting #53, Tdoc R2-061338, May 12-18, 2006, 13 pages provided.
Samsung, "UL Timing Sync Procedure", 3GPP TSG-RAN2 #52, R2-0601006, Mar. 27-31, 2006, 4 pages provided, XP002434793.

* cited by examiner

METHOD FOR TRANSMITTING RANDOM ACCESS CHANNEL MESSAGE AND RESPONSE MESSAGE, AND MOBILE COMMUNICATION TERMINAL

This application is the National Phase of PCT/KR2007/005397 filed on Oct. 30, 2007, which claims priority under 35 U.S.C. 119(e) to U.S. Provisional Application Nos. 60/863,545 filed on Oct. 30, 2006, and 60/884,198 filed on Jan. 9, 2007 and under 35 U.S.C. 119(a) to Patent Application No. 10-2007-0109486 filed in the Republic of Korea on Oct. 30, 2007, respectively, all of which are hereby expressly incorporated by reference into the present application.

TECHNICAL FIELD

The present invention relates to random access of a mobile communication system, and more particularly to a method for controlling transmission power of a random access channel (RACH) response message according to a channel measurement result of a mobile communication terminal for transmitting data using an uplink channel so as to efficiently use a radio resource, and a terminal for supporting the method.

BACKGROUND ART

FIG. 1 is a view showing a network structure of a universal mobile telecommunication system (UMTS).

The UMTS largely includes a user equipment (UE), a UMTS terrestrial radio access network (hereinafter, abbreviated to UTRAN), and a core network (hereinafter, abbreviated to CN). The UTRAN includes at least one radio network sub-system (hereinafter, abbreviated to RNS). Each RNS includes a radio network controller (hereinafter, abbreviated to RNC) and at least one base station (hereinafter, referred to as a Node B) managed by the RNC. One Node B includes at least one cell.

FIG. 2 is a view showing the structure of a radio interface protocol between the UTRAN and the UE on the basis of 3GPP radio access network standard.

As shown in FIG. 2, the radio access interface protocol includes horizontal layers including a physical layer, a data link layer and a network layer, and vertical planes including a user plane for transmitting data information and a control plane for transmitting control signals. In FIG. 2, the protocol layers can be divided into L1 (a first layer), L2 (a second layer), and L3 (a third layer) based on three lower layers of an open system interconnection (OSI) standard model well known in the art of communication systems.

Hereinafter, the layers shown in FIG. 2 will be described. The physical layer which is the first layer provides an information transfer service to an upper layer by using a physical channel. The physical layer is connected to a medium access control layer, which is an upper layer, through a transport channel, and data is transferred between the medium access control layer and the physical layer through the transport channel. In addition, data is transferred between different physical layers, that is, physical layers of a transmission side and a reception side, through a physical channel.

The medium access control (hereinafter, abbreviated to MAC) layer, which is the second layer, provides a service to a radio link control layer, which is an upper layer, through a logic channel. The radio link control (hereinafter, abbreviated to RLC) layer, which is the second layer, provides support for reliable data transmissions, and may perform a function of segmentation and concatenation of an RLC service data unit (SDU) coming from a higher layer.

A radio resource control (hereinafter, abbreviated to RRC) layer located at a lowest portion of the third layer is only defined in the control plane, and controls the logic channels, the transport channels and the physical channels in relation to the configuration, the reconfiguration, and the release of a radio bearer (Hereinafter, abbreviated to RB). At this time, the RB signifies a service provided by the second layer for data transmission between the UE and the UTRAN. In general, the set up of the RB refers to the process of stipulating the characteristics of a protocol layer and a channel required for providing a specific service, and setting the respective detailed parameters and operation methods.

A RACH of a wideband code division multiple access (WCDMA) will be described in more detail as follows. The RACH is used to transfer short length data on an uplink. In more detail, the RACH is used when the UE acquires initial uplink synchronization. The RACH is used when the UE is first turned on or is switched from a long-time idle mode to an active mode such that the uplink synchronization is set again, and may be used without establishing time synchronization or frequency synchronization. The RACH basically supports multiple users. Each UE transmits a specific preamble sequence when accessing the RACH, the Node B recognizes the preamble sequence and transmits a signal to a downlink, and the UE updates its own time synchronization information using the information. At this time, if frequency synchronization information is transmitted together, the frequency synchronization information may be used in the information of the UE.

The RACH, which is the transport channel, is mapped to the physical random access channel (PRACH).

FIG. 3 is a view showing a conventional PRACH transmission.

As shown in FIG. 3, the PRACH is divided into a preamble part and a message part. The preamble part performs a power ramping function for properly controlling transmission power used for message transmission and a function for avoiding collision among several UEs. The message part performs a function for transmitting an MAC protocol data unit (hereinafter, abbreviated to PDU) transferred from the MAC to the physical channel.

When the MAC of the UE instructs a PRACH transmission to the physical layer of the UE, the physical layer of the UE first selects one access slot and one signature, and transmits the preamble on the PRACH to an uplink. The preamble is transmitted within an access slot duration having a length of 1.33 ms, and one signature is selected from 16 signatures within a first certain length of the access slot and is transmitted. When the UE transmits the preamble, the Node B transmits a response signal through an acquisition indicator channel (AICH) which is a downlink physical channel. The AICH, in response to the preamble, transmits the signature which was selected by the preamble within the first certain length of the access slot corresponding to the access slot for transmitting the preamble. At this time, the Node B transmits an acknowledge (ACK) response or a non-acknowledge (NACK) response to the UE through the signature transmitted by the AICH.

When the UE receives the ACK response, the UE transmits a message part having a length of 10 ms or 20 ms using an orthogonal variable spreading factor (OVSF) corresponding to the transmitted signature.

When the UE receives the NACK response, the MAC of the UE instructs a PRACH retransmission to the physical layer of the UE after a certain time period. In contrast, if the UE does not receive the AICH corresponding to the transmitted preamble, the UE transmits a new preamble with power higher than that of the previous preamble, after a predetermined access slot.

FIG. 4 is a view showing an exemplary structure of an AICH which is a conventional downlink physical channel.

The AICH, which is the downlink physical channel, transmits 16 symbol signatures (Si, i=0 . . . 15) for the access slot having a length of 5120 chips. Here, the UE may select any arbitrary signature (Si) from S0 signature to S15 signature, and then transmits the selected signature during the first 4096 chips length. The remaining 1024 chips length is set as a transmission power off period during which no symbol is transmitted. Also, as similar to FIG. 4, the preamble part of the PRACH, which is the uplink physical channel, transmits 16 symbol signatures (Si, i=0 . . . 15) during the first 4096 chips length.

However, in the conventional RACH transmission, since the downlink message, which is transmitted in response to the uplink RACH message transmission, is transmitted with high power so as to be received even in a cell boundary, a radio resource was inefficiently used.

DISCLOSURE OF INVENTION

Accordingly, the present invention is directed to a method for transmitting a random access channel message and a response message, and a mobile communication terminal that substantially obviate one or more problems due to limitations and disadvantages of the related art.

An object of the present invention devised to solve the problem lies on a method for responding to a random access channel message, which is capable of properly controlling transmission power using measurement information of a user equipment (UE) and transmitting a message to the UE.

Another object of the present invention devised to solve the problem lies on a method for transmitting a random access channel message, which is capable of including measurement information of a UE in an uplink message in order to properly control transmission power of a base station.

Another object of the present invention devised to solve the problem lies on a mobile communication terminal which implements a method for transmitting a random access channel message so as to efficiently use a radio resource.

The object of the present invention can be achieved by providing a method for responding to a random access channel message, the method including: reading quality measurement information of a downlink channel from a second layer (hereinafter, referred to as L2) header of a random access channel (RACH) message which is transmitted from a user equipment to an uplink; controlling transmission power of a response message for the RACH message according to the quality measurement information; and transmitting the response message to the user equipment.

Preferably, the L2 header may be a medium access control (MAC) header configuring an MAC protocol data unit (PDU).

Preferably, the controlling of the transmission power may include the following processes if upper layer information is included in the MAC PDU of the RACH message. That is, the process of controlling the transmission power may include removing the quality measurement information from the MAC PDU and transmitting the MAC PDU to the MAC of a radio network controller (RNC). At this time, the upper layer information may be a radio resource control (RRC) message transmitted through at least one of a common control channel (CCCH), a dedicated control channel (DCCH) and a dedicated traffic channel (DTCH), all of which are logic channels.

Preferably, the response message may include any one of an acknowledge (ACK) response for notifying that the RACH message is successfully received and a non-acknowledge (NACK) response for notifying that the RACH message is not successfully received.

In another aspect of the present invention, provided herein is a method for responding to a random access channel message, the method including: reading quality measurement information of a downlink channel included in a payload next to an L2 header from a random access channel (RACH) message which is transmitted from a user equipment to an uplink; controlling transmission power of a response message for the RACH message according to the quality measurement information; and transmitting the response message to the user equipment.

Preferably, the RACH message may store information, which indicates whether or not the quality measurement information is included in the payload, in a target channel type field (TCTF) of the L2 header.

In another aspect of the present invention, provided herein is a method for transmitting a random access channel message, the method including: at a user equipment, measuring quality of a downlink channel and generating quality measurement information of the downlink channel; and including the quality measurement information in an L2 header of a random access channel (RACH) message and transmitting the RACH message to an uplink.

Preferably, the transmitting of the RACH message to the uplink may include transmitting a preamble to the uplink and retransmitting the preamble to the uplink if a response for the preamble is not received or a non-acknowledge response is received. At this time, the RACH message may be transmitted to the uplink if an acknowledge response for the preamble is received.

Preferably, the L2 header may be a medium access control (MAC) header configuring an MAC protocol data unit (PDU).

Preferably, the L2 header may store information, which indicates whether or not the quality measurement information is included in the L2 header, in a target channel type field (TCTF).

In another aspect of the present invention, provided herein is a method for transmitting a random access channel message, the method including: at a user equipment, measuring quality of a downlink channel and generating quality measurement information of the downlink channel; and including the quality measurement information in a payload next to a L2 header of a random access channel (RACH) message and transmitting the RACH message to an uplink.

Preferably, the RACH message may store information, which indicates whether or not the quality measurement information is included in the payload, in a target channel type field (TCTF) of the L2 header.

In another aspect of the present invention, provided herein is a mobile communication terminal for transmitting data to an uplink through random access in a mobile communication system, the mobile communication terminal including: a downlink channel measurement unit which measures quality of a downlink channel and generates quality measurement information of the downlink channel; and a message transmission unit which includes the quality measurement information in an L2 header of a random access channel (RACH) message and transmitting the RACH message to the uplink.

In another aspect of the present invention, provided herein is a mobile communication terminal for transmitting data to an uplink through random access in a mobile communication system, the mobile communication terminal including: a downlink channel measurement unit which measures quality of a downlink channel and generates quality measurement information of the downlink channel; and a message transmission unit which includes the quality measurement information in payload next to an L2 header of a random access channel (RACH) message and transmitting the RACH message to the uplink.

Advantageous Effects

According to embodiments of the present invention, since transmission power can be adaptively controlled according to a channel measurement result of a user equipment (UE), a radio resource can be efficiently used. In a method in which information indicating whether or not quality measurement information is included or whether or not upper layer information is included is notified to a base station through a header, compatibility between the existing UE and a radio network can be maintained.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. However, the range of the present invention is not limited to the below-described embodiments.

Figure 1:
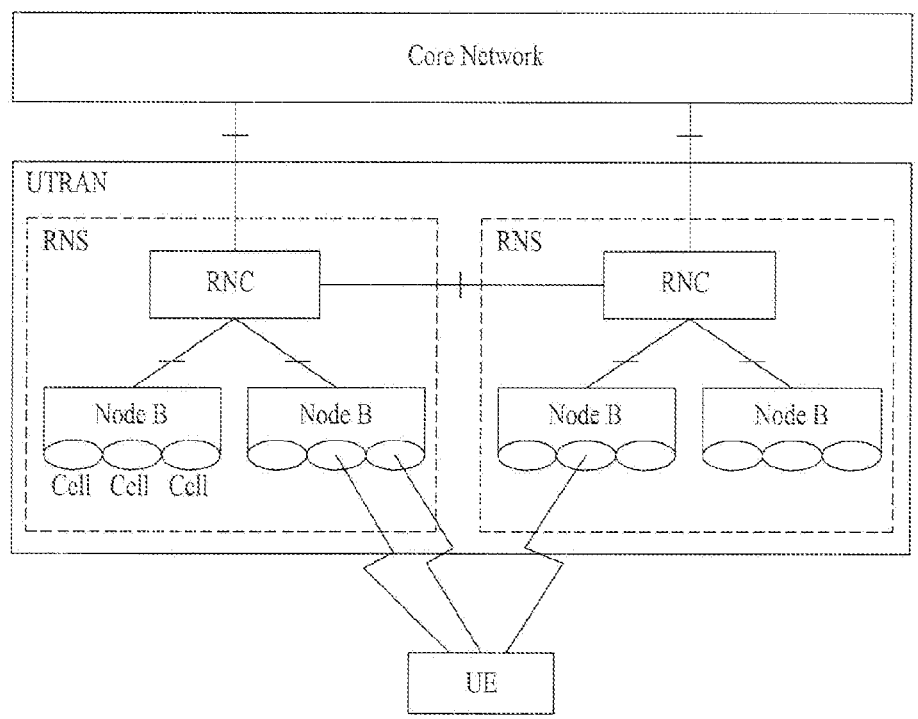
FIG. 1 is a view showing a network structure of a universal mobile telecommunication system (UMTS)
Figure 2:
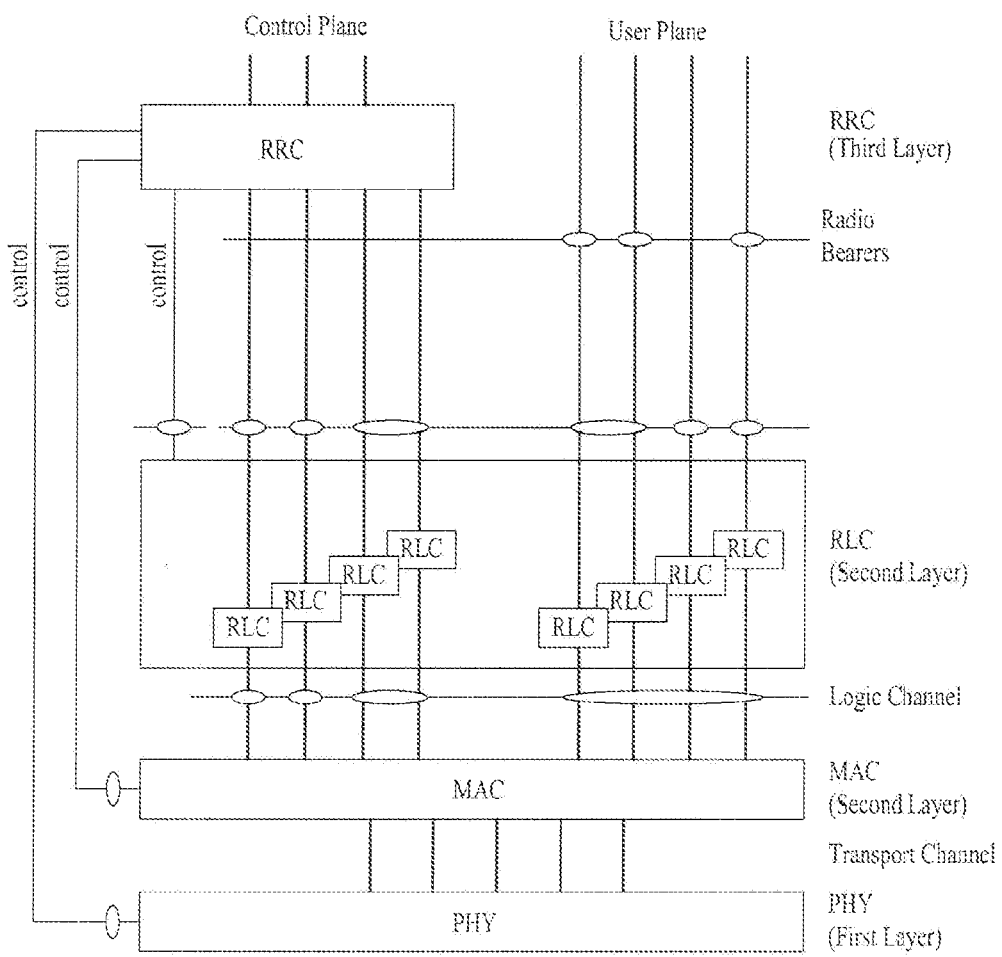
FIG. 2 is a view showing the structure of a radio interface protocol between a UMTS terrestrial radio access network (UTRAN) and a user equipment on the basis of 3GPP radio access network standard.
Figure 3:
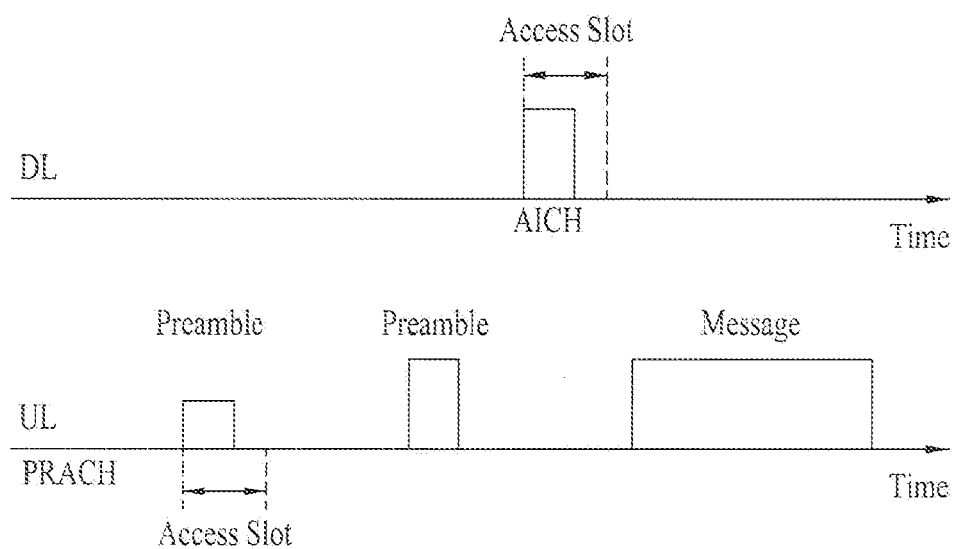
FIG. 3 is a view showing a conventional physical random access channel (PRACH) transmission.
Figure 4:
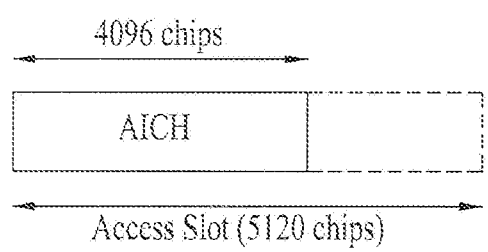
FIG. 4 is a view showing an exemplary structure of an acquisition indicator channel (AICH) which is a downlink physical channel.
Figure 5:
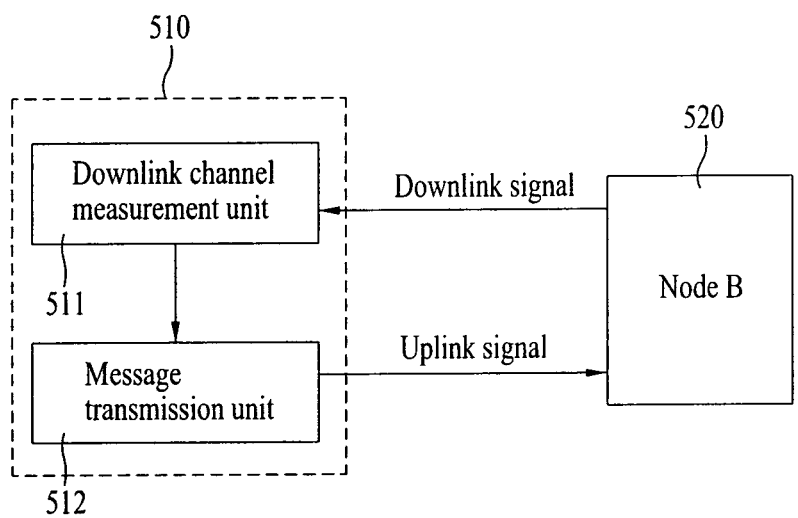
FIG. 5 is a view showing an example of a mobile communication terminal according to the present invention.

FIG. 5 is a view showing an example of a mobile communication terminal 510 according to the present invention.

A downlink channel measurement unit 511 measures the quality of a downlink channel from a downlink signal of a Node B 520 and generates quality measurement information of the downlink channel.

A message transmission unit 512 includes the quality measurement information in a random access message, that is, a RACH message, and transmits the RACH message to the Node B 520 through an uplink signal. The embodiment may vary depending on in which portion of the RACH message the quality measurement information is included. That is, in the mobile communication terminal 510 according to one embodiment of the present invention, the message transmission unit 512 includes the quality measurement information in a header of a second layer L2 of the RACH message. Alternatively, in the mobile communication terminal 510 according to another embodiment of the present invention, the quality measurement information may be included in a payload next to the header of the second layer L2 of the RACH message.

The downlink channel measurement unit 511 and the message transmission unit 512 may be implemented in the form of a program installed in a firmware of the mobile communication terminal 510 or may be implemented by manufacturing respective chips for implementing respective logics. The downlink channel measurement unit 511 and the message transmission unit 512 may be implemented by a single chip for implementing all logics.

Figure 6:
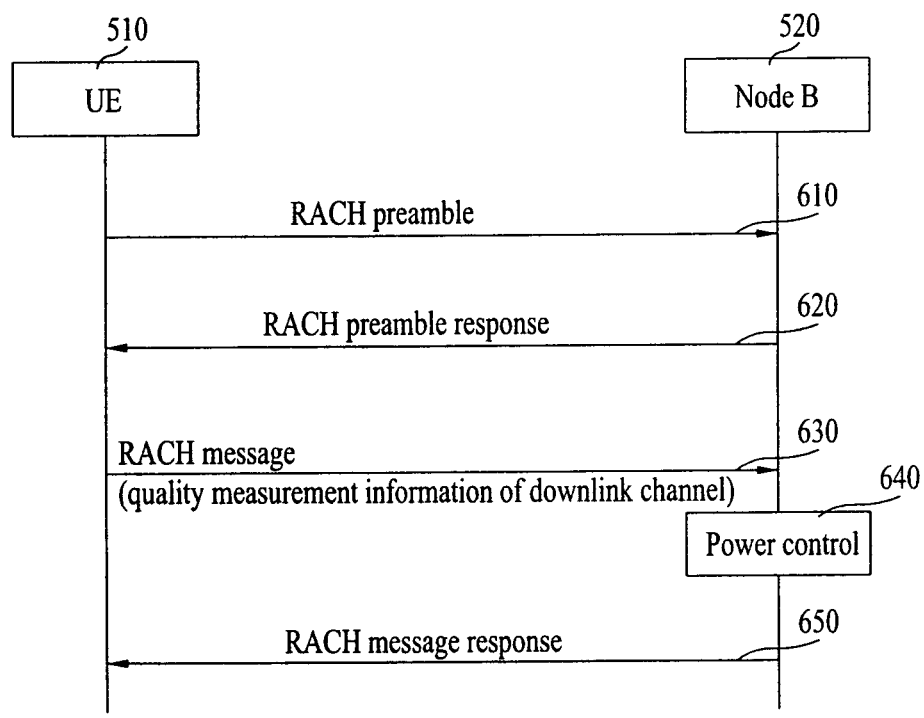
FIG. 6 is a view showing an example of a random access process according to the present invention.

FIG. 6 is a view showing a random access process according to an embodiment of the present invention.

In one embodiment of the present invention, in order to efficiently use a radio resource, a radio user equipment (UE) includes the quality measurement information of the downlink channel in the header of the second layer L2 of the RACH message transmitted to an uplink. A radio network controls transmission power of a response message for the RACH message using the quality measurement information included in the header of the second layer L2 and transmits the response message to the UE.

In another embodiment of the present invention, in order to efficiently use a radio resource, the UE includes the quality measurement information of the downlink channel in the payload next to the header of the second layer L2 of the RACH message transmitted to an uplink. The radio network controls transmission power of a response message for the RACH message using the quality measurement information included in the payload and transmits the response message to the UE. In this case, the radio UE may include the quality measurement information in a L2-PDU in a piggybacking fashion and transmit the RACH message to the radio network.

This embodiment will be described with reference to FIG. 6 as follow.

The UE 510 can transmit the RACH message after a RACH preamble transmission process and a process of responding to the RACH preamble, as shown in FIG. 6.

Accordingly, the UE 510 first transmits the preamble of the RACH to the Node B 520 (610).

Next, when the preamble is accurately received, the Node B 520 transmits an ACK response for the RACH preamble to the UE 510 (620). In contrast, when the preamble is not received or is inaccurately received, the Node B 520 transmits a NACK response for the RACH preamble to the UE 510 (620).

Next, the UE 510 transmits the quality measurement information of the downlink channel of the Node B 520, for example, the RACH message including a channel quality indication (CQI), to the Node B 520 (630). At this time, the RACH message may include at least one L2-PDU. If the L2-PDU includes the quality measurement information, the header of the L2-PDU, that is, the L2 header, can notify whether the quality measurement information is included in the L2 header or the L2-PDU including the header of the L2. For example, the L2 header may be a MAC header configuring the MAC PDU. In more detail, information indicating whether or not the CQI is included in the MAC PDU may be stored in a target channel type field (TCTF) of the MAC header.

The MAC PDU may include a RRC message transmitted to a common control channel (CCCH), a dedicated control channel (DCCH) or a dedicated traffic channel (DTCH), all of which are the logical channels.

When the UE is turned on and then first accesses a new cell, the UE establishes downlink synchronization and receives system information of the cell to be accessed. After the system information is received, the UE transmits an access request message for RRC connection. However, since the UE does not establish time synchronization with a current network and a uplink radio resource is not ensured, the RACH may be used. That is, the UE requests the radio resource for connection request message transmission to the network using the RACH. The Node B which receives the request for the radio resource allocates a proper radio resource to the UE. Then, the UE can transmit a RRC connection request message to the network through the radio resource.

In a state in which the UE is RRC-connected with the network, the UE which is in the RRC connected mode may use the RACH. In this case, the UE receives the radio resource allocated according to radio resource scheduling of the network and transmits data to the network through the allocated radio resource. However, if data to be transmitted is no longer left in the buffer of the UE, the network no longer allocates the uplink radio resource to the UE. This is because the allocation of the uplink radio resource to the UE which does not have data to be transmitted is inefficient. If new data occurs in the buffer of the UE which does not have the radio resource, the UE may use the RACH because the uplink radio resource is not allocated to the UE. That is, the UE may make a request for the radio resource necessary for transmission of data to the network using the RACH.

That is, some RRC messages such as a RRC connection request message, a cell update message and a URA update message may be also transmitted through the RACH. At this time, the CCCH, the DCCH and the DTCH, all of which are the logical channels, may be mapped to the RACH which is the transport channel.

The quality measurement information of the downlink channel may be included in the L2 header, for example, the MAC header, or may be included in a front portion of a MAC payload or a rear portion of the MAC payload next to the L2 header in a piggybacking fashion.

Next, the Node B 520 performs adaptive modulation control (AMC) or power control using the quality measurement information of the downlink channel (640). At this time, the second layer, that is, the MAC layer, of the Node B 520 receives the MAC PDU of the RACH message, checks the MAC header, and checks whether the quality measurement information of the downlink channel is included in the MAC PDU. At this time, if the MAC header notifies that the quality measurement information of the downlink channel is not included, the Node B 520 does not associate the control of the transmission power with the quality measurement information.

Finally, the Node B 520 transmits a RACH response message to the UE 510 using the transmission power controlled according to the quality measurement information of the downlink channel (650).

The UE 510 may include L3 information as well as L2 information in the RACH message, which is transmitted to the uplink, and include the quality measurement information of the downlink channel in the L2 information. At this time, the L3 information may be the RRC message. In addition, the L2 information may notify the Node B 520 that the quality measurement information is included in the L2 information. In particular, the L2 information may be MAC control information which is included in the MAC header or the MAC PDU in the piggybacking fashion, and may be MAC control information included in the payload of the MAC PDU.

In this step 650, three following cases may be realized depending on whether or not the L3 information is included or whether or not the quality measurement information is included in the L2 information.

First, if upper layer information is included in the MAC PDU and the MAC header notifies that the quality measurement information of the downlink channel is included, the Node B 520 removes the quality measurement information from the MAC PDU and reconfigures the MAC PDU. The Node B 520 sends the reconfigured MAC PDU to the MAC of the RNC. In addition, the Node B 520 transmits a response message for the RACH message received from the UE 510 to the UE 510.

Second, if the upper layer information is not included in the MAC PDU and the MAC header notifies that the quality measurement information of the downlink channel is included, the Node B 520 does not send the MAC PDU to the RNC. In this case, the Node B 520 only transmits the response message for the RACH message to the UE 510. At this time, the response message includes the ACK response for notifying that the RACH message is successfully received and the NACK response for notifying that the RACH message is not successfully received. The response message includes information indicating the RACH preamble or information indicating the RACH message. At this time, the indicating information included in the response message may be code information for transmission of the message or the signature of the preamble.

Third, if the MAC header does not notify that the quality measurement information of the downlink channel is included, the Node B 520 only sends the MAC PDU to the MAC of the RNC and transmits the response message to the UE 510.

The RACH response message of the Node B 520 may be transmitted through the L2-PDU, for example, the MAC PDU or may be transmitted through a physical layer control signal. If the response message is transmitted through the MAC PDU, the header of the MAC PDU including the response message notifies the UE 510 that the response message is included in the MAC PDU. In particular, the UE may be notified that the response message is included in the MAC PDU, using the TCTF of the header of the MAC PDU.

Figure 7:
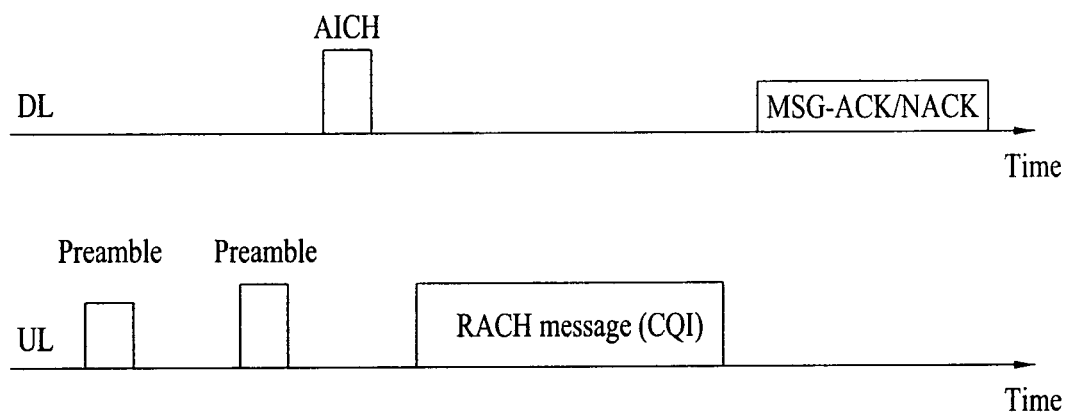
FIG. 7 is a view showing an example of the random access process shown in FIG. 6.

FIG. 7 is a view showing an example of the random access process shown in FIG. 6.

After the transmission (AP) of the RACH preamble and the response (AICH) of the RACH preamble, the UE 510 measures the downlink channel of the Node B 520, includes the quality measurement information in the MAC payload or the MAC header of the MAC PDU, and transmits the RACH message to the uplink.

The response message MSG-ACK/NACK of the Node B 520 for the RACH message is the ACK signal for notifying that the RACH message is successfully received or the NACK signal for notifying that the RACH message is not successfully received.

Meanwhile, when the UE 510 receives the MAC PDU from the Node B 520 and checks that the response message MSG-ACK/NACK is included in the MAC PDU through the header of the MAC PDU, the UE 520 can retransmit the RACH message to the Node B 520 according to the response message MSG-ACK/NACK. In particular, the UE 510 does not retransmit the RACH message if the response message MSG-ACK/NACK received from the Node B 520 is the ACK response and retransmits the RACH message to the Node B 520 if the response message is the NACK response.

Figure 8:
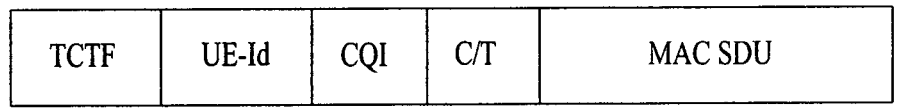
FIG. 8 is a view showing an example of a medium access control (MAC) protocol data unit (PDU) configured according to an embodiment of the present invention.

FIG. 8 is a view showing an example of the MAC PDU configured according to an embodiment of the present invention.

In FIG. 8, the TCTF is included in the MAC header. The TCTF may notify whether or not the quality measurement information, that is, the CQI, is included in the MAC PDU, as described above. The MAC PDU may further include other information such as a UE-Id, a C/T, a MAC service data unit (SDU).

In the present invention, the mobile communication terminal includes the quality measurement information of the downlink channel in the L2 header or payload of the RACH message transmitted to the uplink, and the radio network controls the transmission power of the response message for the RACH message using the quality measurement information included in the L2 header or payload and transmits the response message to the UE. Accordingly, it is possible to efficiently use the radio resource.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

According to the present invention, it is possible to provide a method for controlling transmission power of a RACH response message according to a channel measurement result of a mobile communication terminal for transmitting data using an uplink channel. This method is applicable to an algorithm of a random access process of a mobile communication system, and a user equipment and base station for supporting the same.

What is claimed is:

1. A method for responding to a random access channel message, the method comprising:
    receiving, at a base station, a first message including a random access channel (RACH) preamble from a user equipment;
    transmitting, at the base station, a second message including a RACH preamble response to the user equipment;
    receiving, at the base station after transmitting the second message including the RACH preamble response, a third message including a RACH message from the user equipment;
    reading, at the base station, channel quality measurement information of a downlink channel from a medium access control (MAC) layer header of the third message including the RACH message,
    wherein a channel quality of the downlink channel is measured by the user equipment, and
    wherein the channel quality measurement information is generated by the user equipment based on the measured channel quality and is included in the third message including the RACH message which is transmitted from the user equipment to the base station;
    determining, at the base station, a transmission power of a fourth message including a RACH message response which is transmitted from the base station to the user equipment, according to the channel quality measurement information; and
    transmitting, by the base station in response to the third message including the RACH message, the fourth message including the RACH message response according to the transmission power determined by the base station according to the channel quality measurement information included in the third message.

2. The method according to claim 1, wherein the MAC layer header is a MAC header configuring a MAC protocol data unit (PDU).

3. The method according to claim 2, wherein the determining of the transmission power comprises removing the channel quality measurement information from the MAC PDU and transmitting the MAC PDU to a MAC of a radio network controller (RNC), if upper layer information is included in the MAC PDU of the third message including the RACH message.

4. The method according to claim 3, wherein the upper layer information is a radio resource control (RRC) message transmitted through at least one of a common control channel (CCCH), a dedicated control channel (DCCH) and a dedicated traffic channel (DTCH), all of which are logic channels.

5. The method according to claim 1, wherein the fourth message including the RACH message response includes any one of an acknowledge (ACK) response for notifying that the third message including the RACH message is successfully received and a non-acknowledge (NACK) response for notifying that the third message including the RACH message is not successfully received.

6. A method for responding to a random access channel message, the method comprising:
    receiving, at a base station, a first message including a random access channel (RACH) preamble from a user equipment;
    transmitting, at the base station, a second message including a RACH preamble response to the user equipment;
    receiving, at the base station after transmitting the second message including the RACH preamble response, a third message including a RACH message from the user equipment;
    reading, at the base station, channel quality measurement information of a downlink channel included in a payload next to a medium access control (MAC) layer header from the third message including the RACH message,
    wherein a channel quality of the downlink channel is measured by the user equipment, and
    wherein the channel quality measurement information is generated by the user equipment based on the measured channel quality and is included in the third message including the RACH message which is transmitted from the user equipment to the base station;
    determining, at the base station, a transmission power of a fourth message including a RACH message response which is transmitted from the base station to the user equipment, according to the channel quality measurement information; and
    transmitting, by the base station in response to the third message including the RACH message, the fourth message including the RACH message response according to the transmission power determined by the base station according to the channel quality measurement information included in the third message.

7. The method according to claim 6, wherein the third message including the RACH message stores information, which indicates whether or not the channel quality measurement information is included in the payload, in a target channel type field (TCTF) of the MAC layer header.

8. A method for transmitting a random access channel (RACH) message, the method comprising:
- transmitting, at a user equipment, a first message including a random access channel (RACH) preamble to a base station;
- receiving, at the user equipment, a second message including a RACH preamble response from the base station;
- at the user equipment, measuring channel quality of a downlink channel and generating channel quality measurement information of the downlink channel based on the measured channel quality;
- at the user equipment, including the channel quality measurement information in a medium access control (MAC) layer header of a third message including RACH message and transmitting, after receiving the second message including the RACH preamble response, the third message including the RACH message via an uplink to the base station; and
- at the user equipment, receiving a fourth message including a RACH message response in response to the third message including the RACH message from the base station,
- wherein the channel quality measurement information is read by the base station from the MAC layer header of the third message including the RACH message which is transmitted from the user equipment to the base station, and a transmission power of the fourth message including the RACH message response which is transmitted from the base station to the user equipment is determined by the base station according to the channel quality measurement information included in the third message.

9. The method according to claim 8, wherein the transmitting of the third message including the RACH message via the uplink comprises:
- transmitting, at the user equipment, a preamble via the uplink;
- retransmitting, at the user equipment, the preamble via the uplink if a response for the preamble is not received or a non-acknowledge response is received; and
- transmitting, at the user equipment, the third message including the RACH message via the uplink if an acknowledge response for the preamble is received.

10. The method according to claim 8, wherein the MAC layer header is a MAC header configuring a MAC protocol data unit (PDU).

11. The method according to claim 8, wherein the MAC layer header stores information, which indicates whether or not the channel quality measurement information is included in the MAC layer header, in a target channel type field (TCTF).

12. The method according to claim 8, further comprising retransmitting the third message including the RACH message via the uplink if the fourth message including the RACH message response in response to the third message including the RACH message is a non-acknowledge response.

13. A method for transmitting a random access channel (RACH) message, the method comprising:
- transmitting, at a user equipment, a first message including a random access channel (RACH) preamble to a base station;
- receiving, at the user equipment, a second message including a RACH preamble response from the base station;
- at the user equipment, measuring a channel quality of a downlink channel and generating channel quality measurement information of the downlink channel based on the measured channel quality;
- at the user equipment, including the channel quality measurement information in a payload next to a medium access control (MAC) layer header of a third message including the RACH message and transmitting, after receiving the second message including the RACH preamble response, the third message including the RACH message via an uplink to the base station; and
- at the user equipment, receiving a fourth message including a RACH message response in response to the third message including the RACH message from the base station,
- wherein the channel quality measurement information is read by the base station from the payload next to the MAC layer header of the third message including the RACH message which is transmitted from the user equipment to the base station, and a transmission power of the fourth message including the RACH message response which is transmitted from the base station to the user equipment is determined by the base station according to the channel quality measurement information included in the third message.

14. The method according to claim 13, further comprising retransmitting the third message including the RACH message via the uplink if the fourth message including the RACH message response in response to the third message including the RACH message is a non-acknowledge response.

15. A mobile communication terminal for transmitting data via an uplink through random access in a mobile communication system, the mobile communication terminal comprising:
- a message transmission unit configured to transmit a first message including a random access channel (RACH) preamble to a base station; and
- a downlink channel measurement unit configured to measure a channel quality of a downlink channel and generate channel quality measurement information of the downlink channel based on the measured channel quality,
- wherein the mobile communication terminal is configured to receive, from the base station, a second message including a RACH preamble response in response to the first message including the RACH preamble,
- wherein the message transmission unit is further configured to include the channel quality measurement information in a medium access control (MAC) layer header of a third message including a RACH message and transmitting, after receiving the second message including the RACH preamble response, the third message including the RACH message via the uplink to the base station,
- wherein the mobile communication terminal is further configured to receive a fourth message including a RACH message response in response to the third message including the RACH message from the base station, and
- wherein the channel quality measurement information is read by the base station from the MAC layer header of the third message including the RACH message which is transmitted from the user equipment to the base station, and a transmission power of the fourth message including the RACH message response which is transmitted from the base station to the user equipment is determined by the base station according to the channel quality measurement information included in the third message.

16. A mobile communication terminal for transmitting data via an uplink through random access in a mobile communication system, the mobile communication terminal comprising:

a message transmission unit configured to transmit a first message including a random access channel (RACH) preamble to a base station; and a downlink channel measurement unit configured to measure a channel quality of a downlink channel and generate channel quality measurement information of the downlink channel based on the measured channel quality, wherein the mobile communication terminal is configured to receive, from the base station, a second message including a RACH preamble response in response to the first message including the RACH preamble, wherein the message transmission unit is further configured to include the channel quality measurement information in a payload next to a medium access control (MAC) layer header of a third message including a RACH message and transmitting, after receiving the second message including the RACH preamble response, the third message including the RACH message via the uplink to the base station, wherein the mobile communication terminal is further configured to receive a fourth message including a RACH message response in response to the third message including the RACH message from the base station, and wherein the channel quality measurement information is read by the base station from the payload next to the MAC layer header of the third message including the RACH message which is transmitted from the user equipment to the base station, and a transmission power of the fourth message including the RACH message response which is transmitted from the base station to the user equipment is determined by the base station according to the channel quality measurement information included in the third message.

17. The method according to claim 1, wherein the base station performs an adaptive modulation control for a downlink transmission using the channel quality measurement information.

18. The method according to claim 6, wherein the base station performs an adaptive modulation control for a downlink transmission using the channel quality measurement information.

19. The method according to claim 8, wherein the base station performs an adaptive modulation control for a downlink transmission using the channel quality measurement information.

20. The method according to claim 13, wherein the base station performs an adaptive modulation control for a downlink transmission using the channel quality measurement information.

* * * * *